United States Patent
Currie

(10) Patent No.: US 10,832,534 B1
(45) Date of Patent: Nov. 10, 2020

(54) DOORBELL CUSTOMIZATION ASSEMBLY

(71) Applicant: Rahsaan Currie, Arlington, TX (US)

(72) Inventor: Rahsaan Currie, Arlington, TX (US)

( * ) Notice: Subject to any disclaimer, the term of this patent is extended or adjusted under 35 U.S.C. 154(b) by 0 days.

(21) Appl. No.: 16/505,942

(22) Filed: Jul. 9, 2019

(51) Int. Cl.
| G08B 3/10 | (2006.01) |
| E02B 15/02 | (2006.01) |
| E05B 15/02 | (2006.01) |

(52) U.S. Cl.
CPC .............. G08B 3/10 (2013.01); E05B 15/02 (2013.01)

(58) Field of Classification Search
CPC .................................. G08B 3/10; E05B 15/02
USPC ....................................................... 340/396.1
See application file for complete search history.

(56) References Cited

U.S. PATENT DOCUMENTS

| 1,070,387 A * | 8/1913 | Baldwin ................... G08B 5/36 340/330 |
| 2,447,226 A * | 8/1948 | Bennett .................... H01H 3/20 200/308 |
| 2,951,138 A * | 8/1960 | Petrino .................. H01H 25/06 200/330 |
| 5,604,478 A * | 2/1997 | Grady .................... A01K 15/02 340/330 |
| 5,774,041 A | 6/1998 | Xydis |
| 5,883,570 A | 3/1999 | Lusareta |
| 5,952,926 A * | 9/1999 | Syverson ............... A01K 1/035 119/174 |
| D417,853 S * | 12/1999 | Walker ......................... D10/121 |
| 6,600,117 B1 * | 7/2003 | Gretz ....................... H02G 3/14 174/502 |
| 6,750,760 B2 | 6/2004 | Albritton |
| D541,689 S | 5/2007 | Meyers |
| 7,471,210 B2 | 12/2008 | Cole |
| 7,714,243 B2 * | 5/2010 | Birdwell ............ H01H 11/0006 174/54 |
| 8,154,391 B1 * | 4/2012 | Morris ................... H01H 13/56 200/296 |
| 8,536,991 B2 | 9/2013 | Gilbert |
| 2006/0290477 A1 * | 12/2006 | Cole, Sr. ................ G06Q 30/08 340/384.7 |
| 2010/0045456 A1 * | 2/2010 | Koennecke .............. G08B 3/10 340/539.1 |
| 2011/0227732 A1 * | 9/2011 | Hermanson .............. G08B 3/10 340/541 |

* cited by examiner

Primary Examiner — John A Tweel, Jr.

(57) ABSTRACT

A doorbell customization assembly includes a doorbell mount mountable on a wall of a building. A switch is coupled to the doorbell mount and the switch is electrically coupled to a doorbell for ringing the doorbell. A receiver is coupled to the doorbell mount, the receiver surrounds the switch and the receiver has a plurality of keyways therein. A disk engages each of the keyways in the receiver such that the disk is removably coupled to the receiver. The disk turns the switch on when the disk is depressed to ring the doorbell. Logo indicia are printed on the disk to enhance the ornamental appeal of the doorbell on the building.

6 Claims, 7 Drawing Sheets

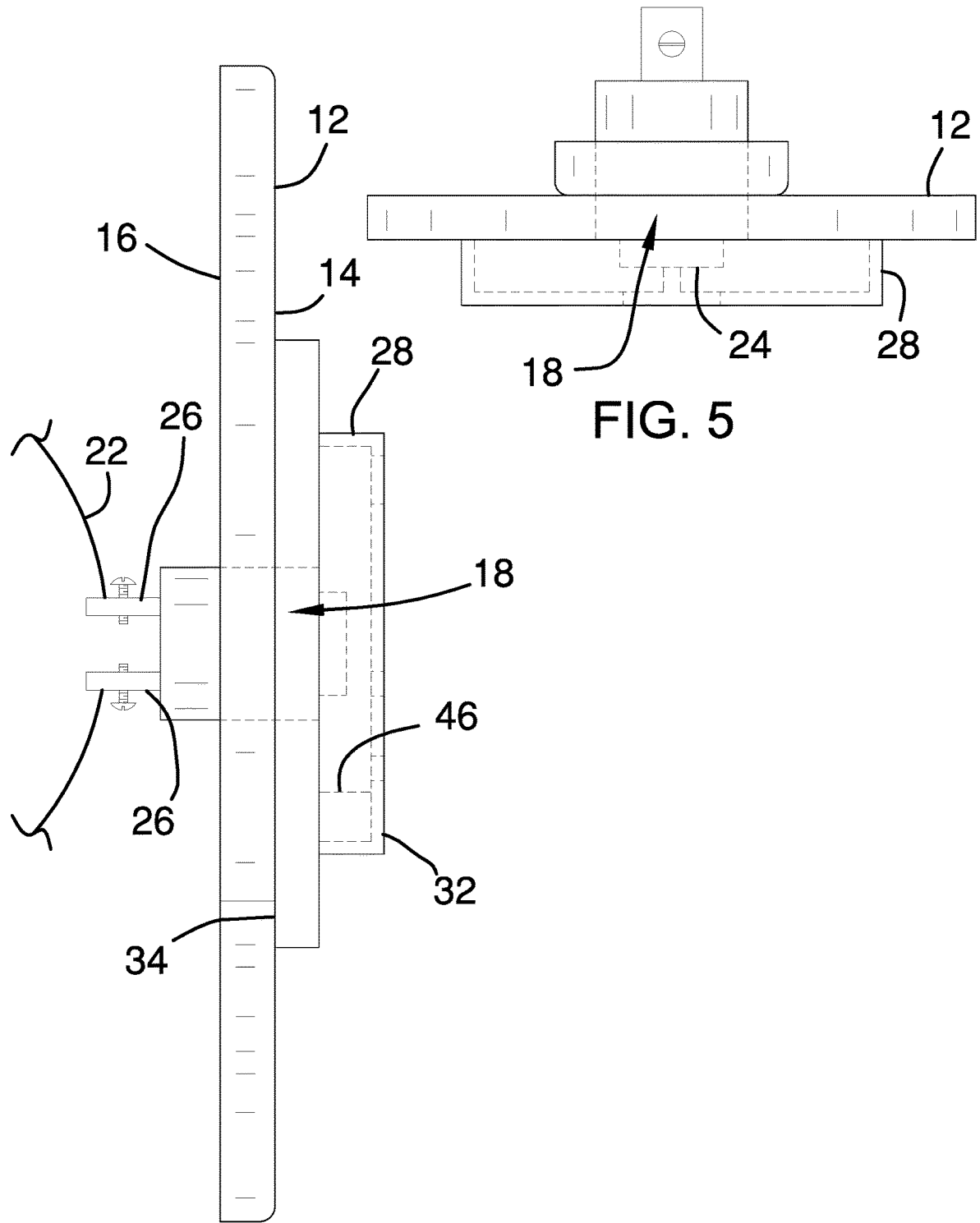

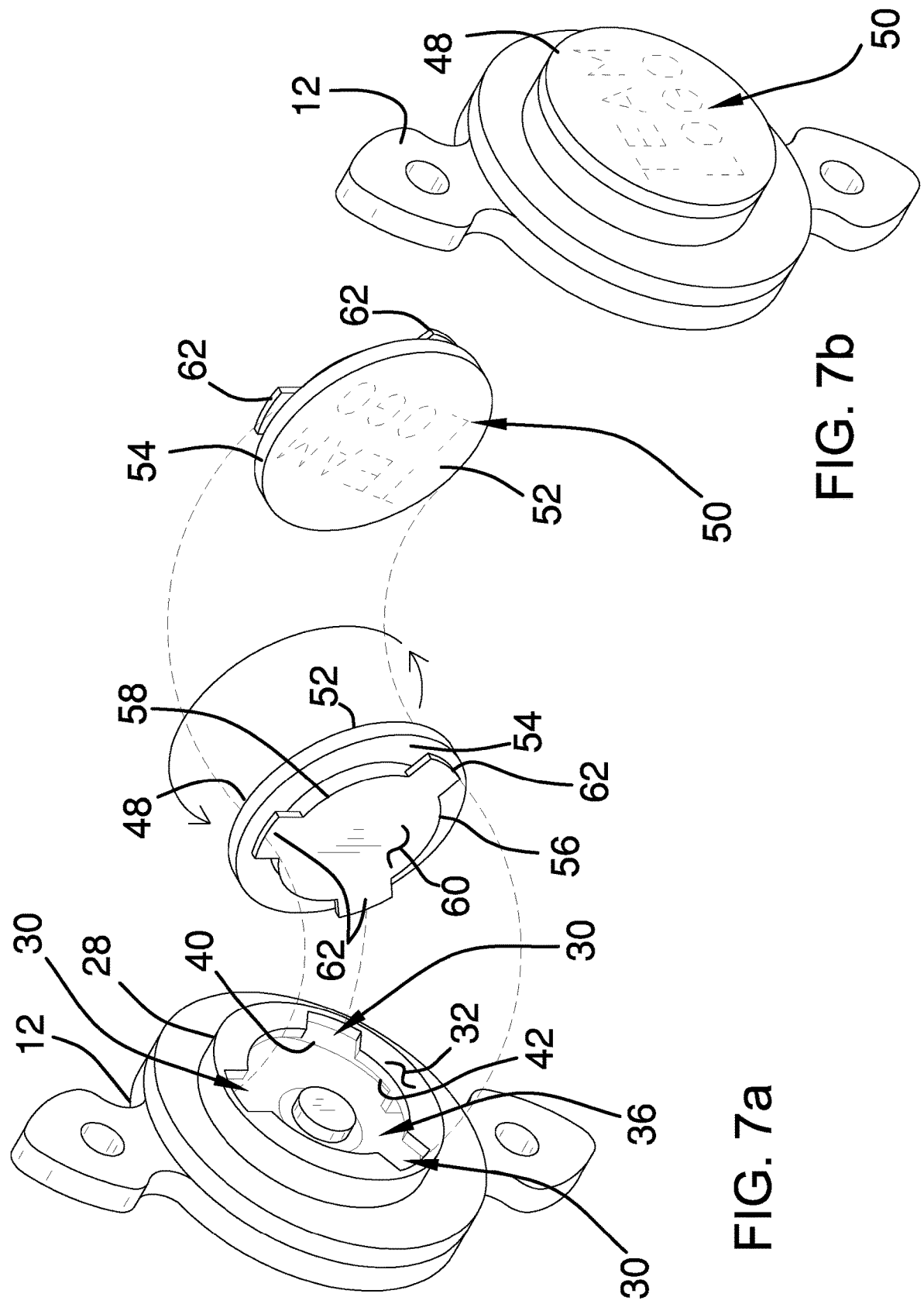

US 10,832,534 B1

DOORBELL CUSTOMIZATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to doorbell devices and more particularly pertains to a new doorbell device for displaying logo indicia on a doorbell.

BRIEF SUMMARY OF THE INVENTION

An embodiment of the disclosure meets the needs presented above by generally comprising a doorbell mount mountable on a wall of a building. A switch is coupled to the doorbell mount and the switch is electrically coupled to a doorbell for ringing the doorbell. A receiver is coupled to the doorbell mount, the receiver surrounds the switch and the receiver has a plurality of keyways therein. A disk engages each of the keyways in the receiver such that the disk is removably coupled to the receiver. The disk turns the switch on when the disk is depressed to ring the doorbell. Logo indicia are printed on the disk to enhance the ornamental appeal of the doorbell on the building.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 4 is a right side phantom view of an embodiment of the disclosure.

FIG. 5 is a top phantom view of an embodiment of the disclosure.

FIG. 7a is a perspective exploded view of an embodiment of the disclosure.

FIG. 7b is a perspective view of an embodiment of the disclosure.

DETAILED DESCRIPTION OF THE INVENTION

Figure 1:
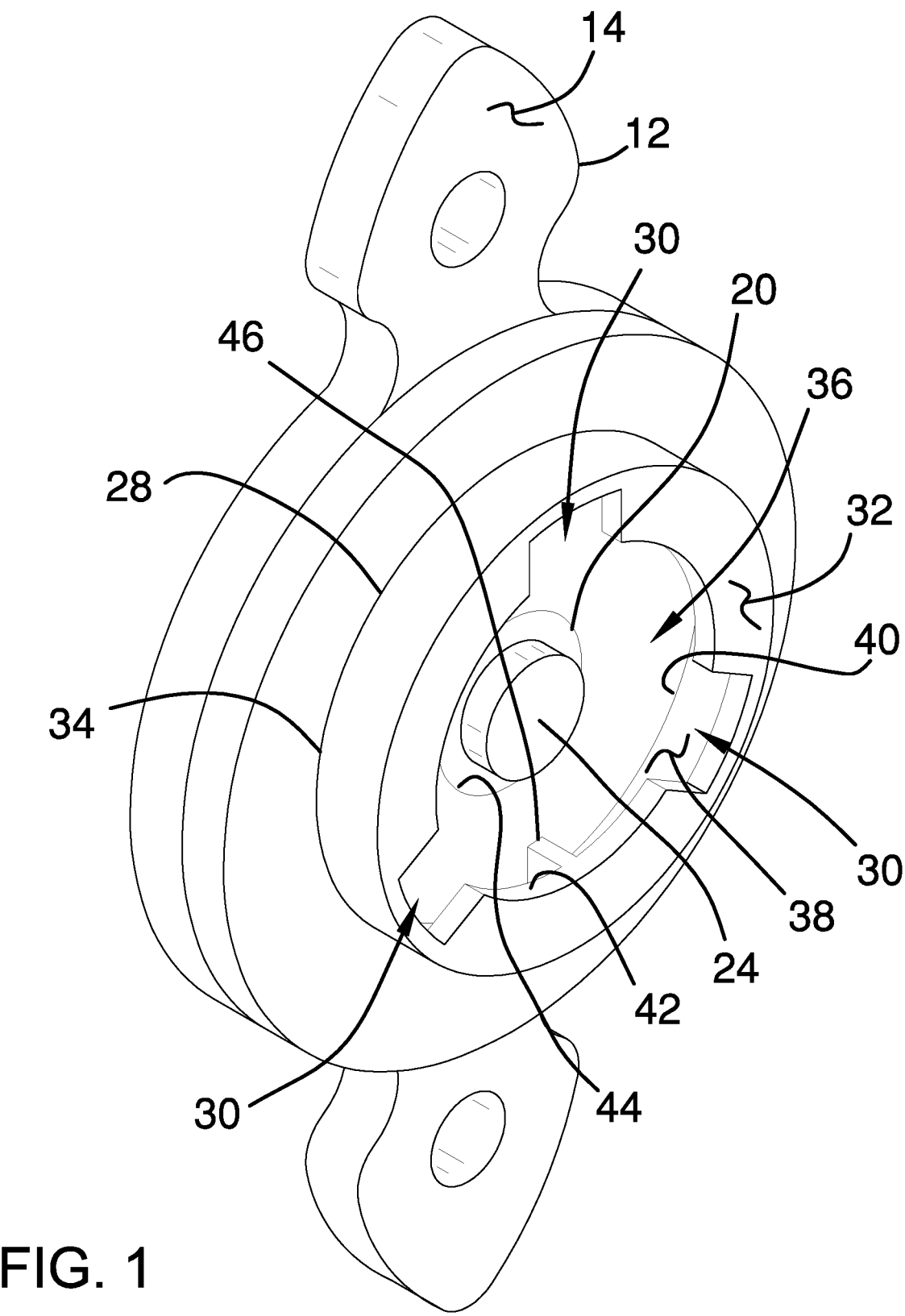
FIG. 1 is a front perspective view of a doorbell customization assembly according to an embodiment of the disclosure.
Figure 2:
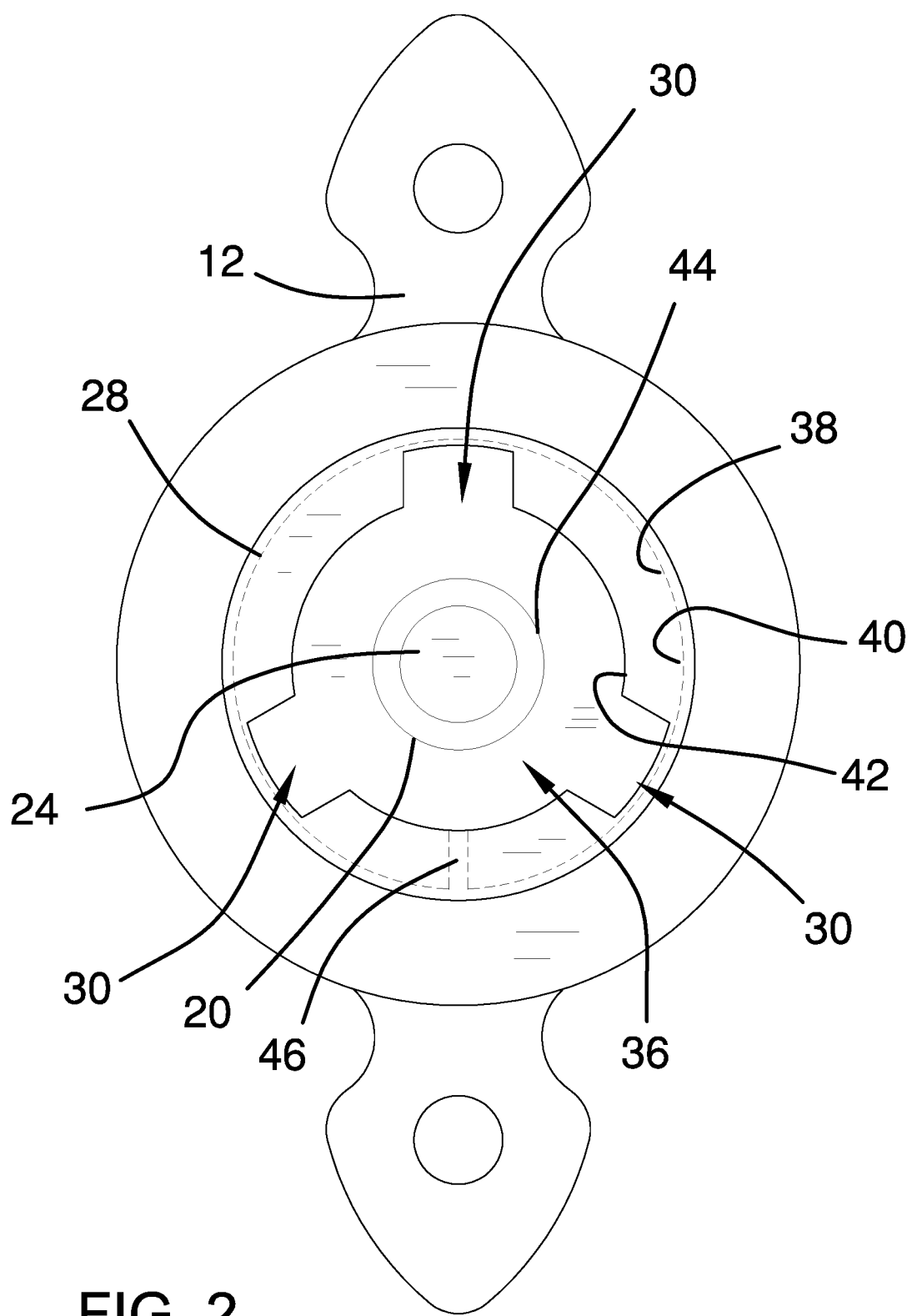
FIG. 2 is a front view of an embodiment of the disclosure.
Figure 3:
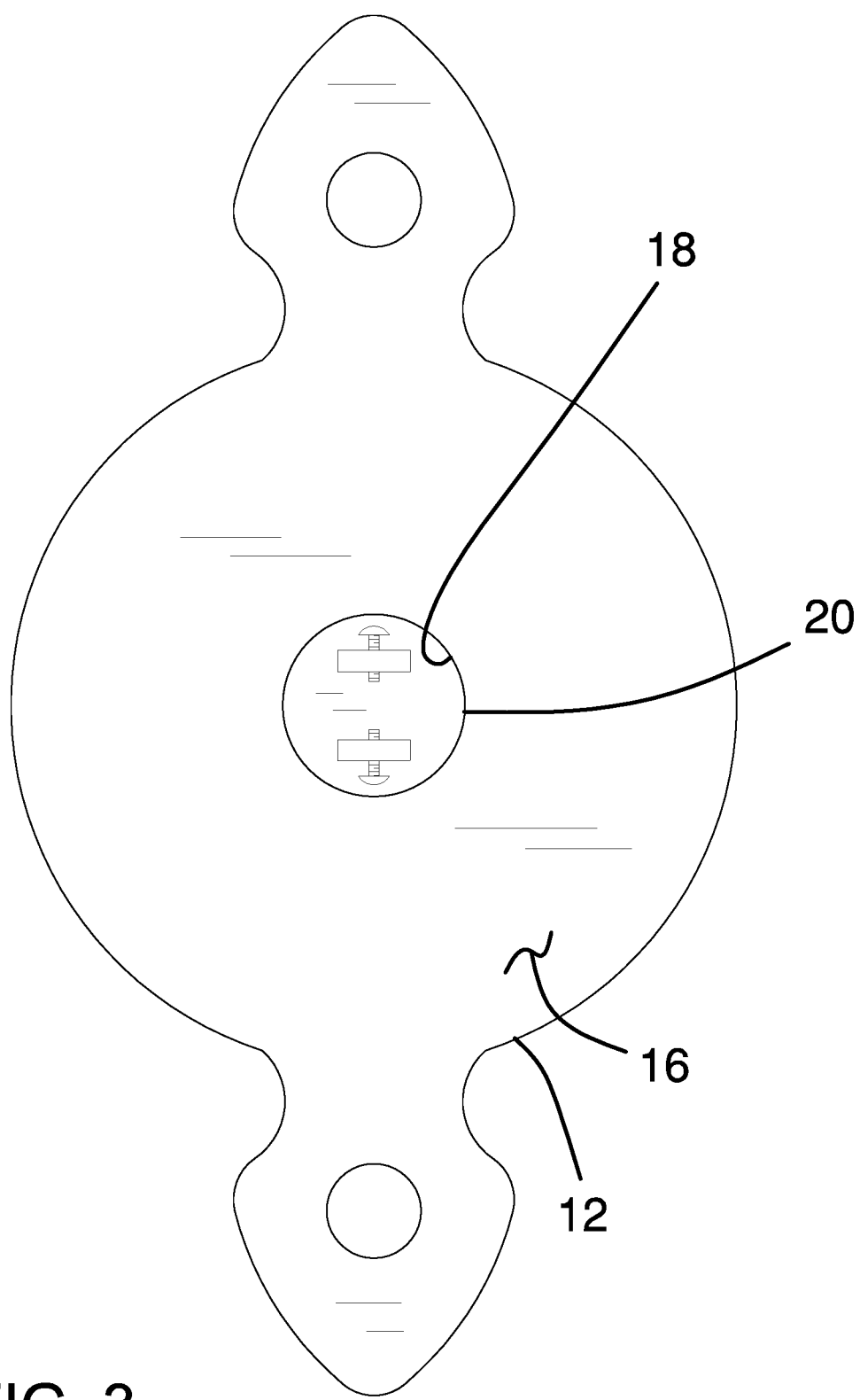
FIG. 3 is a back view of an embodiment of the disclosure.
Figure 6A:
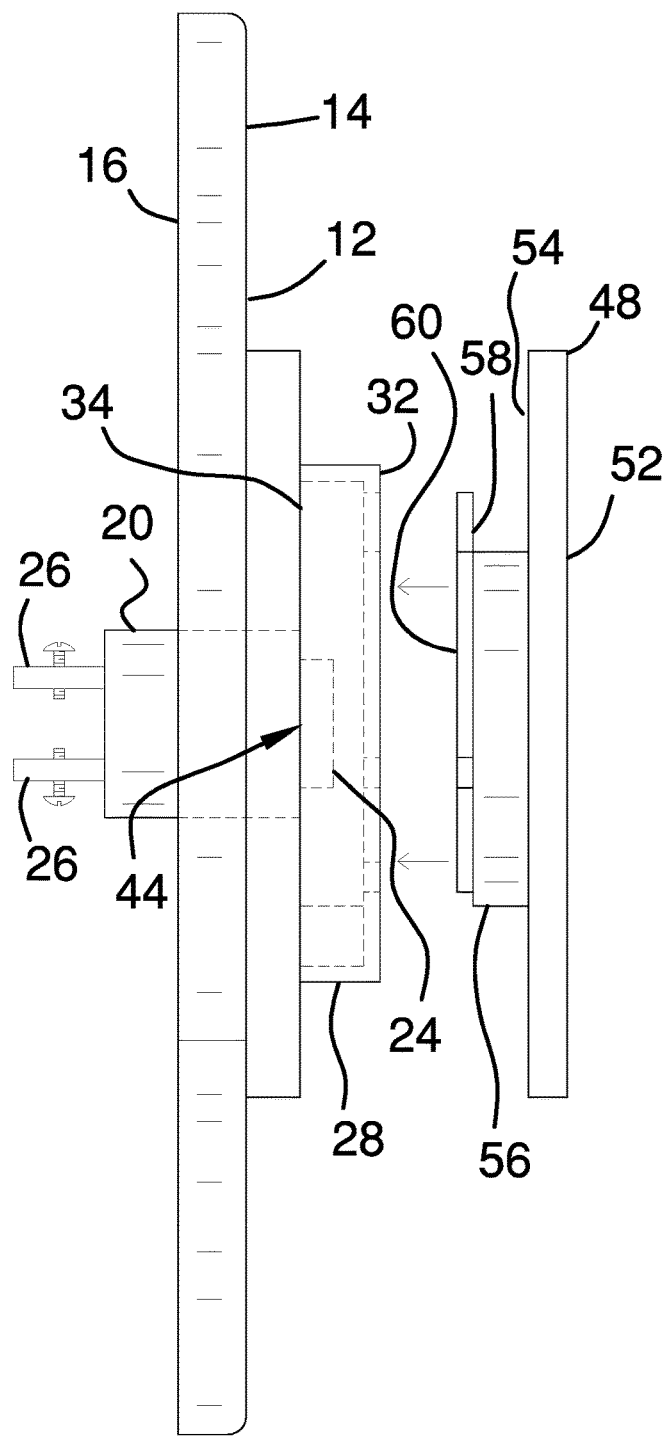
FIG. 6a is a right side exploded view of an embodiment of the disclosure.
Figure 6B:
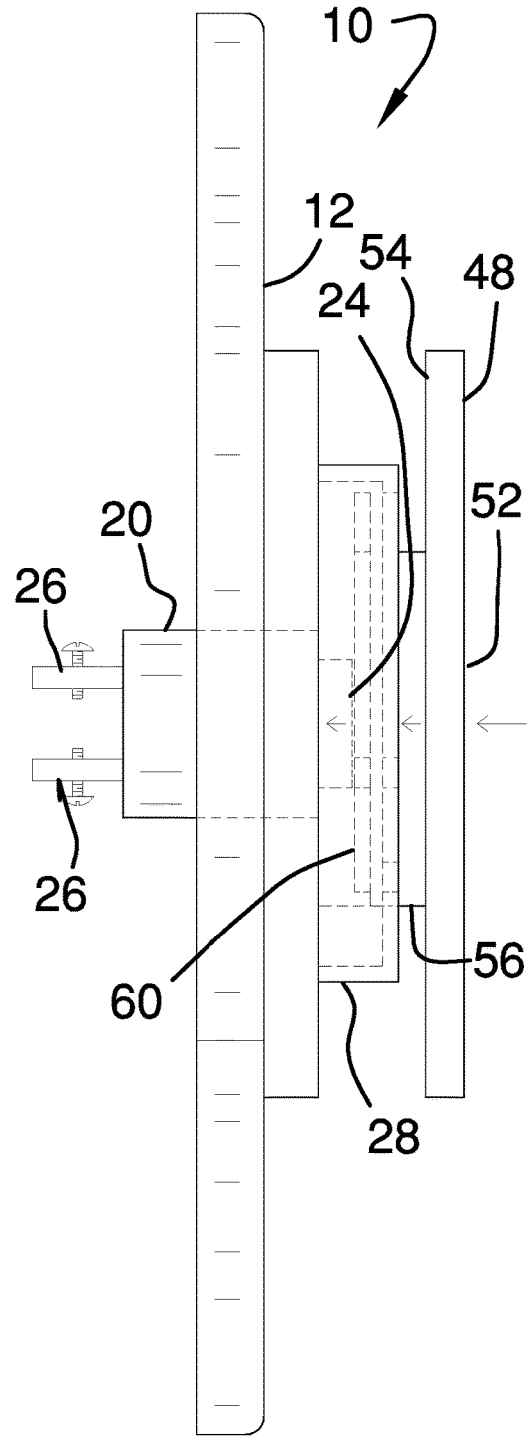
FIG. 6b is a right side view of an embodiment of the disclosure showing a disk being depressed.
Figure 8:
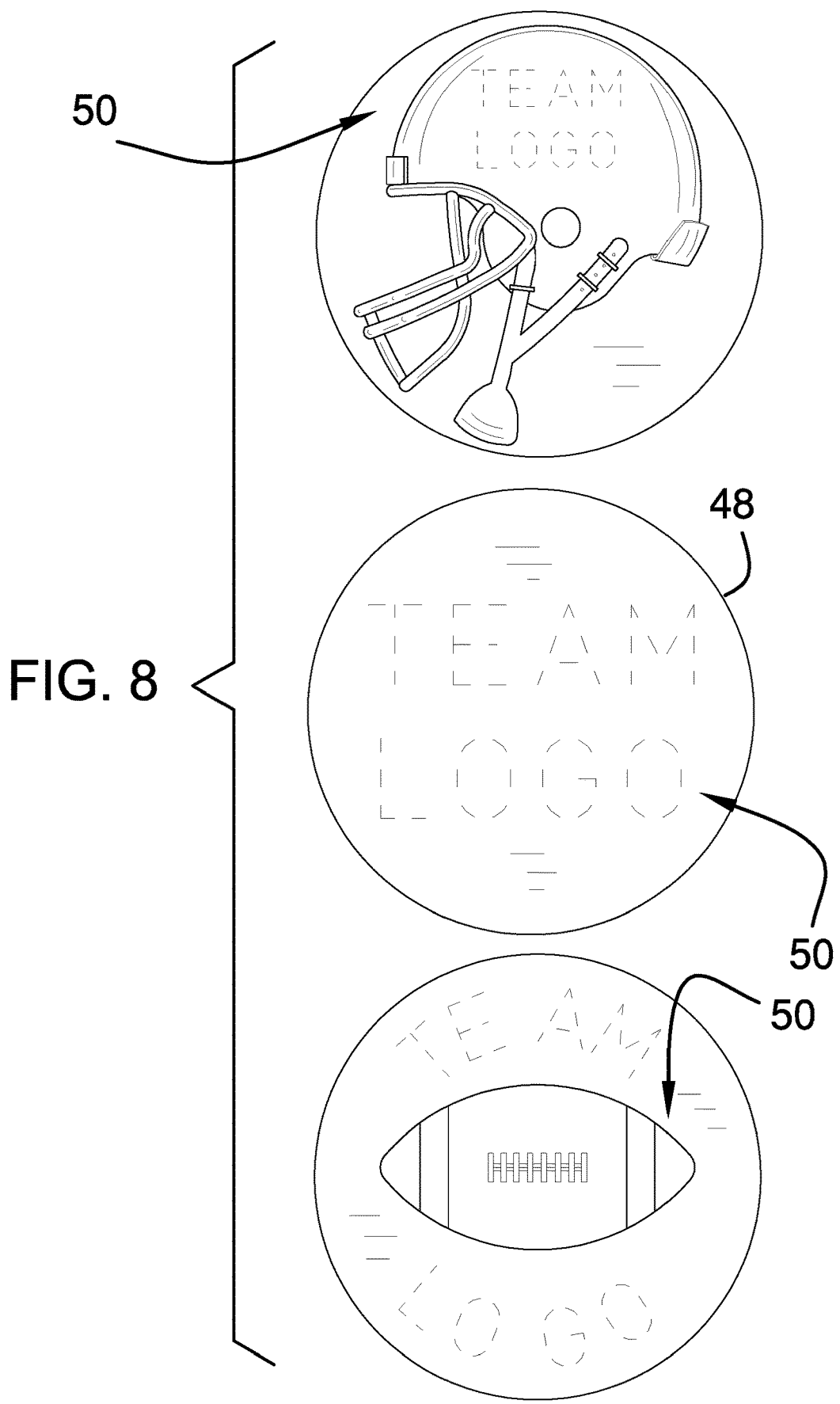
FIG. 8 is a front view of a disk an embodiment of the disclosure.

With reference now to the drawings, and in particular to FIGS. 1 through 8 thereof, a new doorbell device embodying the principles and concepts of an embodiment of the disclosure and generally designated by the reference numeral 10 will be described.

As best illustrated in FIGS. 1 through 8, the doorbell customization assembly 10 generally comprises a doorbell mount 12 is mountable on a wall of a building. The doorbell mount 12 has a front surface 14 and a back surface 16, and the doorbell mount 12 has a switch aperture 18 extending through the front surface 14 and the back surface 16. A switch 20 is coupled to the doorbell mount 12 and the switch 20 is electrically coupled to a doorbell 22 for ringing the doorbell 22. The switch 20 has a plunger 24 and a plurality of terminals 26. The switch 20 is positioned in the switch aperture 18 having the plunger 24 extending beyond the front surface 14 of the doorbell mount 12. The plunger 24 is depressed to turn on the switch 20 and ring the doorbell 22, and the switch 20 is biased into an off position.

A receiver 28 is coupled to the doorbell mount 12 and the receiver 28 surrounds the switch 20. The receiver 28 has a plurality of keyways 30 therein. Additionally, the receiver 28 has a forward surface 32 and a rearward surface 34, and the forward surface 32 has a well 36 extending toward the rearward surface 34. The well 36 has a bounding surface 38 and the bounding surface 38 has a first portion 40 that is recessed with respect to a second portion 42 of the bounding surface 38.

Each of the keyways 30 extends through the forward surface 32. The keyways 30 are spaced apart from each other and are distributed around the second portion 42 of the bounding surface 38 of the well 36. The rearward surface 34 has a hole 44 extending therethrough and intersects the well 36. The rearward surface 34 abuts the front surface 14 of the doorbell mount 12 having the plunger 24 on the switch 20 extending through the hole 44 in the receiver 28. The receiver 28 has a stop 46 therein and the stop 46 is positioned on the first portion 40 of the bounding surface 38 of the well 36. The stop 46 is offset from the keyways 30.

A disk 48 engages each of the keyways 30 in the receiver 28 such that the disk 48 is removably coupled to the receiver 28. The disk 48 turns the switch 20 on when the disk 48 is depressed to ring the doorbell 22. Logo indicia 50 are printed on the disk 48 to enhance the ornamental appeal of the doorbell 22 on the building. The logo indicia 50 may comprise a sports team logo, a product logo or any other type of image that a user may wish to display.

The disk 48 has a front side 52 and a back side 54, and the back side 54 has a prominence 56 thereon. The prominence 56 has a perimeter edge 58 and a distal surface 60 with respect to the back side 54 of the disk 48. The perimeter edge 58 has a plurality of tabs 62 thereon and each of the tabs 62 is spaced from the back side 54 of the disk 48. Each of the tabs 62 extends through a respective one of the keyways 30 in the receiver 28.

The disk 48 is rotated into a locking position having each of the tabs 62 being offset from the respective keyway 30 to retain the disk 48 on the receiver 28. A respective one of the tabs 62 abuts the stop 46 in the receiver 28 when the disk 48 is rotated into the locking position. The distal surface 60 of the prominence 56 engages the plunger 24 of the switch 20 when the disk 48 is positioned in the receiver 28. Additionally, the logo indicia 50 are positioned on the front side 52 of disk 48. The logo indicia 50 on the disk 48 are chosen by the user prior to installing the disk 48 on the receiver 28.

In use, the doorbell mount 12 is mounted on the wall of the building and the terminals 26 on the switch 20 are coupled to wiring for the doorbell 22. The disk 48 is attached to the receiver 28 thereby facilitating the logo indicia 50 to be displayed on the doorbell 22. In this way the logo indicia 50 enhances the ornamental appearance of the doorbell 22, as well 36 as communicating, for example, the sports team supported by the occupant of the building. The disk 48 is depressed to ring the doorbell 22.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A doorbell customization assembly being configured to display a selected logo on a doorbell, said assembly comprising:
   a doorbell mount being mountable on a wall of a building;
   a switch being coupled to said doorbell mount wherein said switch is configured to be electrically coupled to a doorbell for ringing the doorbell;
   a receiver being coupled to said doorbell mount, said receiver surrounding said switch, said receiver having a plurality of keyways therein, said receiver having a forward surface and a rearward surface, said forward surface having a well extending toward said rearward surface, said well having a bounding surface, said bounding surface having a first portion being recessed with respect to a second portion of said bounding surface, each of said keyways extending through said forward surface, said keyways being spaced apart from each other and being distributed around said second portion of said bounding surface of said well, said rearward surface having a hole extending therethrough and intersecting said well, said rearward surface abutting a front surface of said doorbell mount having a plunger on said switch extending through said hole in said receiver, said receiver having a stop therein, said stop being positioned on said first portion of said bounding surface of said well, said stop being offset from said keyways; and
   a disk engaging each of said keyways in said receiver such that said disk is removably coupled to said receiver, said disk turning said switch on when said disk is depressed to ring the doorbell, said disk having logo indicia being printed thereon wherein said disk is configured to enhance the ornamental appeal of the doorbell on the building, said disk having a front side and a back side, said back side having a prominence thereon, said prominence having a perimeter edge and a distal surface with respect to said back side of said disk, said perimeter edge having a plurality of tabs thereon, each of said tabs being spaced from said back side of said disk.

2. The assembly according to claim 1, wherein:
   said doorbell mount has a front surface and a back surface, said doorbell mount having a switch aperture extending through said front surface and said back surface; and
   said switch has a plunger and a plurality of terminals, said switch being positioned in said switch aperture having said plunger extending beyond said front surface of said doorbell mount, said plunger being depressed to turn on said switch and ring the doorbell.

3. The assembly according to claim 1, wherein each of said tabs extends through a respective one of said keyways in said receiver, said disk being rotated into a locking position having each of said tabs being offset from said respective keyway to retain said disk on said receiver, a respective one of said tabs abutting said stop in said receiver when said disk is rotated into said locking position.

4. The assembly according to claim 3, wherein said distal surface of said prominence engages said plunger of said switch when said disk is positioned in said receiver.

5. The assembly according to claim 4, wherein said logo indicia is positioned on said front side of disk.

6. A doorbell customization assembly being configured to display a selected logo on a doorbell, said assembly comprising:
   a doorbell mount being mountable on a wall of a building, said doorbell mount having a front surface and a back surface, said doorbell mount having a switch aperture extending through said front surface and said back surface;

a switch being coupled to said doorbell mount wherein said switch is configured go be electrically coupled to a doorbell for ringing the doorbell, said switch having a plunger and a plurality of terminals, said switch being positioned in said switch aperture having said plunger extending beyond said front surface of said doorbell mount, said plunger being depressed to turn on said switch and ring the doorbell, said switch being biased into an off position;

a receiver being coupled to said doorbell mount, said receiver surrounding said switch, said receiver having a plurality of keyways therein, said receiver having a forward surface and a rearward surface, said forward surface having a well extending toward said rearward surface, said well having a bounding surface, said bounding surface having a first portion being recessed with respect to a second portion of said bounding surface, each of said keyways extending through said forward surface, said keyways being spaced apart from each other and being distributed around said second portion of said bounding surface of said well, said rearward surface having a hole extending therethrough and intersecting said well, said rearward surface abutting said front surface of said doorbell mount having said plunger on said switch extending through said hole in said receiver, said receiver having a stop therein, said stop being positioned on said first portion of said bounding surface of said well, said stop being offset from said keyways; and a disk engaging each of said keyways in said receiver such that said disk is removably coupled to said receiver, said disk turning said switch on when said disk is depressed to ring the doorbell, said disk having logo indicia being printed thereon wherein said disk is configured to enhance the ornamental appeal of the doorbell on the building, said disk having a front side and a back side, said back side having a prominence thereon, said prominence having a perimeter edge and a distal surface with respect to said back side of said disk, said perimeter edge having a plurality of tabs thereon, each of said tabs being spaced from said back side of said disk, each of said tabs extending through a respective one of said keyways in said receiver, said disk being rotated into a locking position having each of said tabs being offset from said respective keyway to retain said disk on said receiver, a respective one of said tabs abutting said stop in said receiver when said disk is rotated into said locking position, said distal surface of said prominence engaging said plunger of said switch when said disk is positioned in said receiver, said logo indicia being positioned on said front side of disk.

* * * * *